United States Patent [19]

Rosener et al.

[11] Patent Number: 4,586,037
[45] Date of Patent: Apr. 29, 1986

[54] RASTER DISPLAY SMOOTH LINE GENERATION

[75] Inventors: Harvey J. Rosener, Sherwood; David L. Knierim, Wilsonville; John C. Dalrymple, Newberg, all of Oreg.

[73] Assignee: Tektronix, Inc., Beaverton, Oreg.

[21] Appl. No.: 472,463

[22] Filed: Mar. 7, 1983

[51] Int. Cl.[4] .............................................. G09G 1/06
[52] U.S. Cl. .................................... 340/728; 340/724; 364/702
[58] Field of Search ............... 340/723, 724, 728, 739, 340/740; 364/702

[56] References Cited

U.S. PATENT DOCUMENTS

| | | | |
|---|---|---|---|
| 3,818,475 | 6/1974 | Hussey | 340/798 X |
| 4,119,956 | 10/1978 | Murray | 340/740 X |
| 4,208,719 | 6/1980 | Lotz et al. | 340/728 X |
| 4,212,009 | 7/1980 | Adleman et al. | 340/728 |
| 4,237,457 | 12/1980 | Houldsworth | 340/728 |
| 4,331,955 | 5/1982 | Hansen | 340/728 |
| 4,345,244 | 8/1982 | Greer et al. | 340/728 |
| 4,365,309 | 12/1982 | Noguchi et al. | 364/702 |
| 4,371,872 | 2/1983 | Rossman | 340/728 |
| 4,386,345 | 5/1983 | Narveson et al. | 340/703 |
| 4,386,349 | 5/1983 | Granberg et al. | 340/724 X |
| 4,425,559 | 1/1984 | Sherman | 340/703 X |
| 4,447,809 | 5/1984 | Kodama et al. | 340/703 X |
| 4,481,509 | 11/1984 | Sasaki et al. | 340/728 |
| 4,482,893 | 11/1984 | Edelson | 340/728 X |
| 4,486,785 | 12/1984 | Lasher et al. | 340/728 X |

Primary Examiner—Marshall M. Curtis
Assistant Examiner—Vincent P. Kovalick
Attorney, Agent, or Firm—Allston L. Jones; Francis I. Gray

[57] ABSTRACT

A high speed arrangement for generating smooth lines of consistent thickness regardless of slope in a raster type display system such as a computer graphics system. A digital differential analyzer is employed for determining Y-position information to n bits of fraction for each integral step in X within a single operative clock cycle. All pixel positions are identified that are relevantly proximate to the starting end point of the line, to the concluding end point, and each one-dimensional array of at least three contiguous pixel positions encompassing a cross-section of the interior portion of the line. Intensity values are determined for each such identified pixel position based upon its distance from the true line, with the intensities of the pixel positions identified in each array being additionally determined based upon the slope of the line. For crossing-line situations in color systems, proportional weighting apparatus is provided which generates a new pixel-position value based upon the existing intensity value, the desired color of the line and the intensity value associated to the crossing line, with the latter constituting a proportionality constant.

13 Claims, 19 Drawing Figures

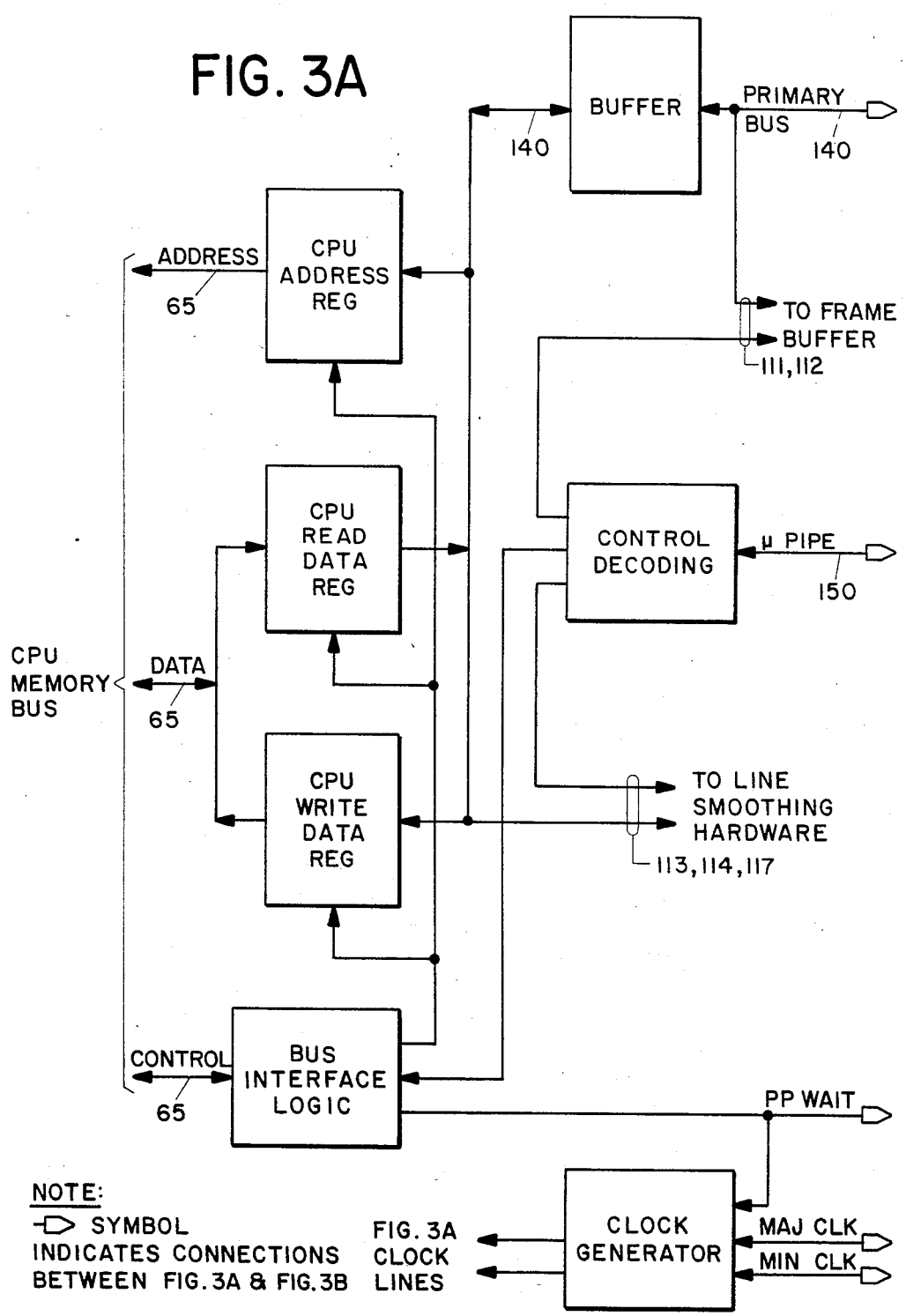

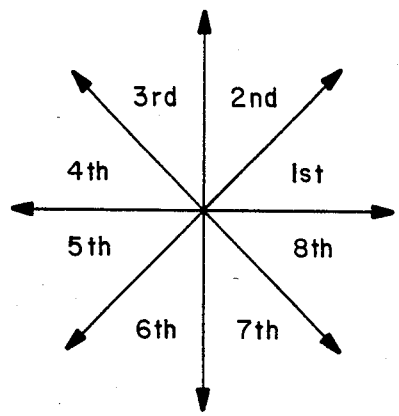

OCTANT LABELING

FIG. 7A

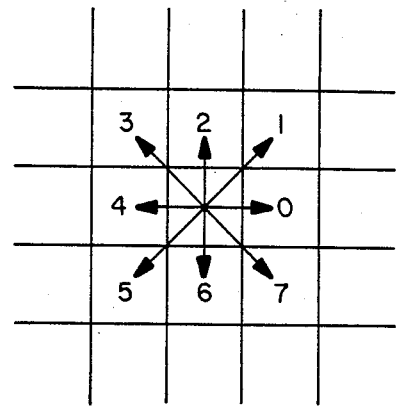

3 BIT STEP COMMANDS

FIG. 7B

| OCTANT | OCTANT REGISTER(164) | ADDER/SUBTRACTOR(165) OPERATION |
|---|---|---|
| FIRST | 1 | STEP CONTROL = 0 + ROM(163) STEP OUTPUT |
| SECOND | 2 | STEP CONTROL = 2 − ROM(163) STEP OUTPUT |
| THIRD | 3 | STEP CONTROL = 2 + ROM(163) STEP OUTPUT |
| FORTH | 4 | STEP CONTROL = 4 − ROM(163) STEP OUTPUT |
| FIFTH | 5 | STEP CONTROL = 4 + ROM(163) STEP OUTPUT |
| SIXTH | 6 | STEP CONTROL = 6 + ROM(163) STEP OUTPUT |
| SEVENTH | 7 | STEP CONTROL = 6 − ROM(163) STEP OUTPUT |
| EIGHTH | 0 | STEP CONTROL = 0 − ROM(163) STEP OUTPUT |

OCTANT TABLE

FIG. 7C

NOTE:
STEP CONTROL ARITHMETIC IS MODULO 8, AS ONLY 3 BITS ARE USED.

PIXEL WRITING SEQUENCE

STEP VALUES OUT OF ROM 163 BEFORE ADDER 165

FIG. 9C

|   |   | 2 | 0 | 1 |   |
|---|---|---|---|---|---|
|   |   | 4 | 6,3 | 6 |   |
|   |   | 1 | 0 | 0 |   |
|   | 4 | 4 | 2 |   |   |
|   | 1 | 0 | 0 |   |   |
|   | 4 | 4 | 2 |   |   |
|   | 1 | 0 | 0 |   |   |
|   | 4 | 4 | 2 |   |   |
|   | 1 | 0 | 0 |   |   |
|   | 4 | 4 | 2 |   |   |
|   | 1 | 0 | 0 |   |   |
|   | 4 | 4 | 2 |   |   |
|   | 1 | 0 | 0 |   |   |
|   | 4 | 4 | 2 |   |   |
|   | 1 | 0 | 0 |   |   |
|   | 4 | 4 | 2 |   |   |
|   | 1 | 0 | 0 |   |   |
| 4 | 4 | 2 |   |   |   |
| 2 | 0 | 0 |   |   |   |
| 2 | 4 | 0 |   |   |   |
| 4 | 6 |   |   |   |   |

STEP VALUES AFTER ADDER/SUBTRACTOR 165 (INTO FIFO)

FIG. 9D

NOTE:
GIVEN HERE AS DECIMAL FRACTIONS.

RASTER DISPLAY SMOOTH LINE GENERATION

BACKGROUND AND SUMMARY OF THE INVENTION

This invention relates to the generation of smooth lines or edges of images in raster-scan type displays, and more particularly to line generating apparatus for displaying smooth lines with intensity and color modulated picture elements (pixels). As used herein, the word "line" shall generally be deemed to include and cover edges of characters or other images.

To reconstruct a line in raster format, digital differential analyzer (DDA) may be used. For each incremental step of the DDA, say on the X axis, Y-position information will be generated for every pixel in the line. This is true, of course, for lines closer to the X axis (less than 45 degrees from horizontal). For lines closer to vertical (Y axis), the DDA will generate X-position information for steps along the Y axis. Accordingly, in the former case the so-called large axis would be the X axis and in the latter case the large axis would be the Y axis, and in each case the so-called small axis would be the axis perpendicular thereto. Thus, the DDA steps along the large axis, generating small axis position information.

Due to the fixed location of the raster pixels, the equivalent line usually has a staircase structure or is jagged. If the DDA is allowed to operate at a higher resolution than the raster screen resolution, the distance between the true or theoretical line and the individual pixel position (a function of the small axis distance) can be resolved and utilized in terms of modulating pixel intensity to create the appearance of a smooth line.

This technique has been successfully implemented in so-called purely software arrangements involving complex and very precise algorithms, and in hardware arrangements as may be represented, for example, by the disclosure in Japanese Patent Application No. 2626/79, filed on Jan. 12, 1979 to Daini Seikosha (Disclosure No. 95986/80, July 21, 1980; inventor Masayuki Matsumoto). A basic objection of the purely software arrangements is the relative slowness with which the lines are recreated accurately in display (i.e. graphics drawing speed), which is a principal result of the sequential nature of internal operation of such an arrangement.

Known hardware systems, while generally being able to substantially improve upon the speed of operation, nevertheless significantly suffer in terms of the actual displayed image by virtue of inadequate intensity (and color) modulation regarding the full compliment of pixels relevantly associated by position to the true or theoretical line intended to be recreated. Moreover, such systems tend to produce images in which readily apparent changes in line thickness occur as a function of the slope of the line. That is, lines other than vertical (Y axis) or horizontal (X axis) will varyingly (with slope) appear thinner, with lines having a 45 degree slope orientation appearing thinnest of all.

Additionally, these systems do not resolve the line end points to fractional pixel precision, and the lines must begin and end centered on a pixel position. Thus, although an advance may be provided with respect to line smoothing per se, none is provided with regard to precise line positioning. This effect is particularly undesirable in the case of approximately smooth curves comprised of many short vectors or line segments.

Even if such systems did resolve the end points to fractional pixel accuracy, there would still be needed special end point treatment to eliminate or prevent the appearance of angular slicing of the ends of the lines. This angular slicing effect stems from terminating the lines horizontally or vertically even when the lines are oriented other than vertically or horizontally.

In the arrangement depicted in the above-mentioned patent application, as example, intensity information may be said to be generated for two pixels on the small axis (e.g. Y axis) for each step along the large axis (X axis), i.e. the pixel on the line (or closest to it) and the adjacent pixel next closest to the line, with the total (fully-on) intensity of a single pixel being apportioned between them. Such line coverage is insufficiently selective to provide a highly accurate representation of the true line, particularly in view of those situations where all relevant pixels in the small axis for a given large axis increment would include not only the pixel on the line itself but the adjacent pixels on each side of the line. Moreover, this previously disclosed system does not solve the problem of varying line thickness with slope. It is thus deemed incapable of suggesting an efficient and high speed approach for full and consistent line coverage, i.e. providing small axis position information with regard to each pixel of a 3 (or more)-pixel array encompassing the line for a step along the large axis, and slope independence.

Reconstruction of a near-perfect anti-aliased or smooth image requires knowledge of every line crossing a given pixel before determining its intensity (or indeed its color in polychromatic systems), and utilization of this information to achieve an appropriate balance between the intensity values and/or colors associated to respective lines. A system attempting to carry this out would, however, be unacceptably slow.

Previous systems have either ignored the so-called old pixel value (e.g. the value already stored in the frame buffer system for a first line to be drawn), or used it in a so-called maximum value operation, with alpha (in its simplest form the fractional coverage of a pixel by the line to be drawn) times the line intensity. In the latter case, which is monochrome only, the effect is to write the new pixel value only if it is larger than the old value. In either case, the average errors are greater than say for proportional weighting when compared to the above-mentioned ideal case.

The above drawbacks are overcome according to the present invention, wherein a high speed system is provided for generating smooth lines to n bits (typically up to 6) of fractional pixel accuracy, both as to the line mid-section and its end points, and which provides special end points treatment which assures a true representation of the line, properly positioned, in display. The small axis distance information and slope information are utilized to assign alpha values (e.g. gray scale or intensity values in a monochrome system) to a set of pixels (at least 3) in an array providing a highly representative cross-section of the theoretical line for the incremental portions (large axis) of a DDA with consistency of line thickness regardless of line slope. Successive arrays of relevant pixels are sequentially treated efficiently in a zig-zag coverage of the line in conjunction with the special end points treatment. The small axis positional information for each array of pixels is generated within a single clock cycle. The alpha values generated are utilized, when appropriate, to provide proportional weighting between old pixel values and the desired line color, with alpha being the proportionality constant.

In a system according to the invention, sequencing of the pixels is such as to require only X and Y increment-/decrement commands along with alpha values to be supplied to the frame buffer system. Since smoothing is accomplished during the building of the raster image, no after-filtering is required. Moreover, an operative mode of selective erase can be readily effected.

BRIEF DESCRIPTION OF THE DRAWINGS

The above-mentioned and other features and advantages of the present invention will become better understood with reference to the following detailed description taken in conjunction with the accompanying drawings, in which:

FIG. 3A illustrates in block diagram form, interfacing between the micro-coded engine portion of the system depicted in FIG. 1 on the one hand and the central processing unit (CPU), line smoothing hardware, and frame buffer thereof on the other hand;

FIGS. 7A-7C illustrate the operation of the octant register 164 and adder/substracter 165 of FIG. 7;

FIGS. 9A-9E are graphic illustrations of various generations being performed by the line smoothing arrangement of the present invention in recreating a line in raster format, wherein for ease of illustration, pixels are shown centered in the grid squares, rather than at the vertices as in FIGS. 2A and 2B.

DESCRIPTION OF THE PREFERRED EMBODIMENT(S)

Figure 1:
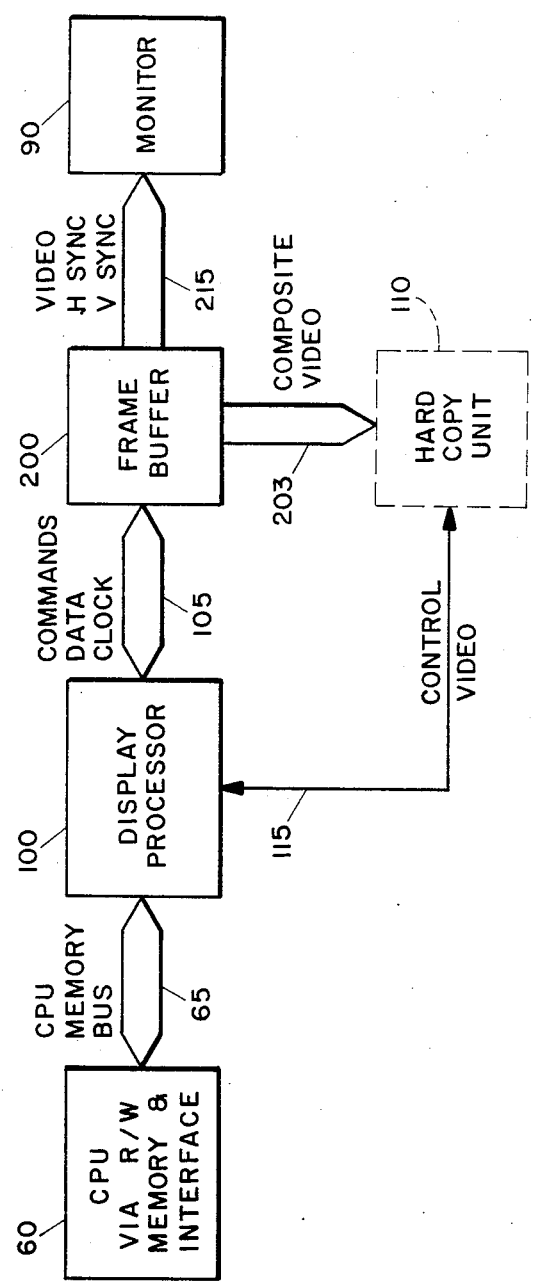
FIG. 1 illustrates in block form a typical global architecture of a raster scan display system.

In the raster scan display system illustrated in FIG. 1, for example a color-video system with optional hard-copy capability (the system in practice may take the form of a raster computer terminal or a stand-alone computer graphics system), a display processor 100 is interconnected to and controlled by a central processor unit (CPU) and its interfacing 60,65. In particular, CPU block 60 may be thought of as including one or more data sources connected to a CPU (e.g. an 8086 commercially available from Intel Corporation) via a host interface, with the CPU in turn being operatively connected to the display processor via a display list memory and a memory (or CPU) interface.

The display processor is operatively linked by lines 105 to a frame buffer unit 200 of conventional construction. The frame buffer stage in turn is coupled to a monitor, e.g. a video display, by video and sync lines 215 and may also be coupled by lines 203 to a hard copy unit such as a printer 110. The latter would also be controllably connected to the display processor 100 via line 115.

Frame Buffer Specifications

Figure 2:
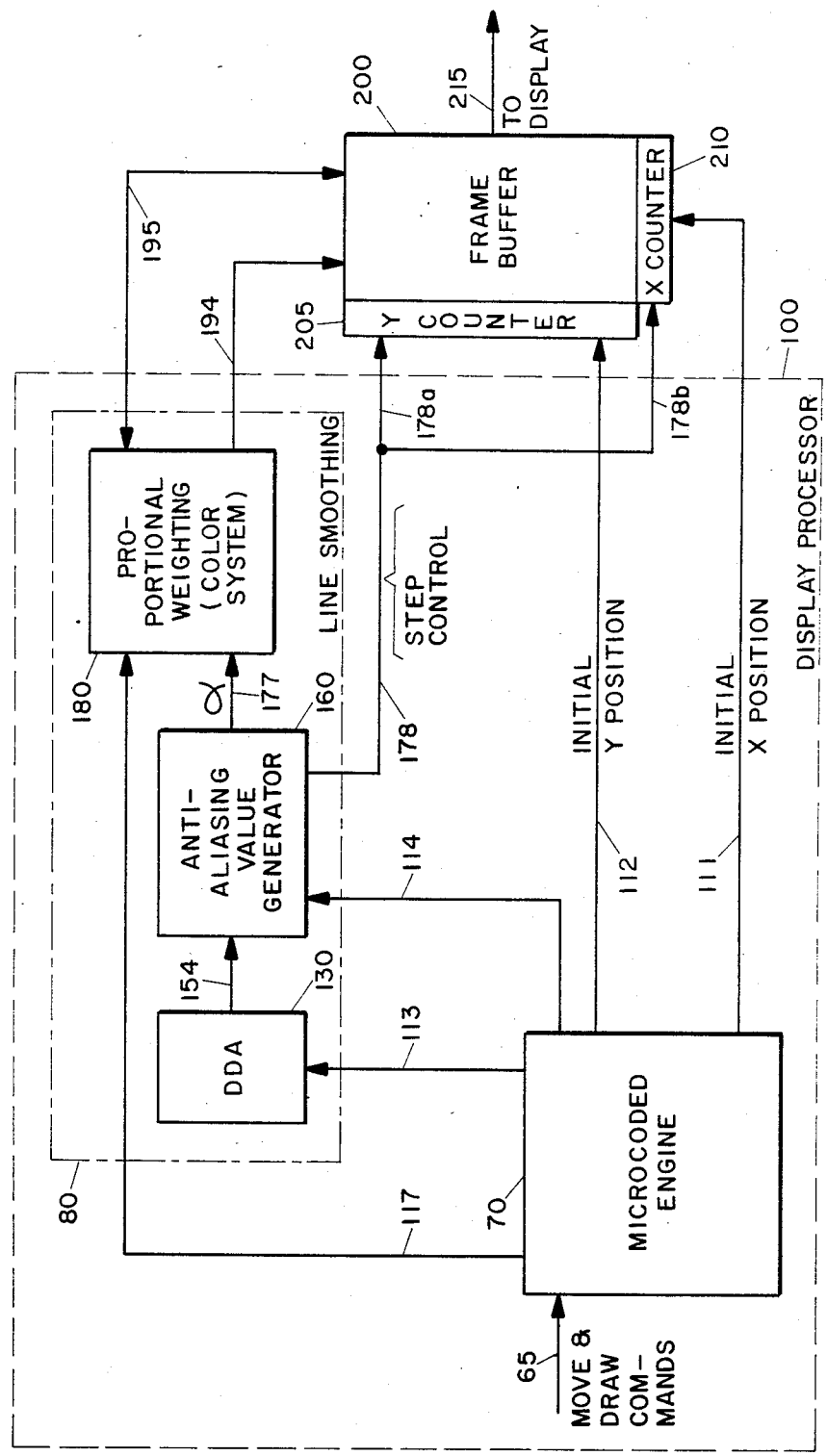
FIG. 2 illustrates in a block diagram the global architecture of line smoothing improvements to a raster scan system such as is depicted in FIG. 1, in accordance with the invention.

The frame buffer 200 of FIG. 2, along with counters 205 and 210, may have the following capabilities. The counters can be individually loaded with any value from the microcoded engine. Further, they can be incremented and decremented under control of say a 3-bit step command carried by connection 178. The Y counter 205 will increment on the step commands 1, 2 and 3, decrement on commands 5, 6 and 7, and hold (do neither) on commands 0 and 4. The X counter 210 will increment on step commands 7, 0 and 1, decrement on commands 3, 4, and 5, and hold on commands 2 and 6. These step commands are graphically illustrated in FIG. 7B. The values in counters 205 and 210 at any one instant address storage for a single pixel of say 8 bits. This pixel data can be read over line 195, or written to a new value from line 194. By changing the values in the counters, every pixel on the screen can be addressed.

Transparent to the accesses over lines 194 and 195, the frame buffer memory may be read out 60 times a second in raster scan order, with this data being sent to the display over the 215. The frame buffer addressing for this display output is generated by a separate counter, which also generates horizontal and vertical sync signals for the display monitor. This counter is not shown, as it is a standard part of raster scan frame buffer systems. Transparency between the two frame buffer access mechanisms may be obtained in this system by alternating memory cycles between this screen refresh task and the accesses over lines 194 and 195 using counters 205 and 210. The other common method is to allow access over lines 194 and 195 only during horizontal and vertical retrace times. The latter option decreases performance, but otherwise has no effect on a system with this invention.

Figure 3B:
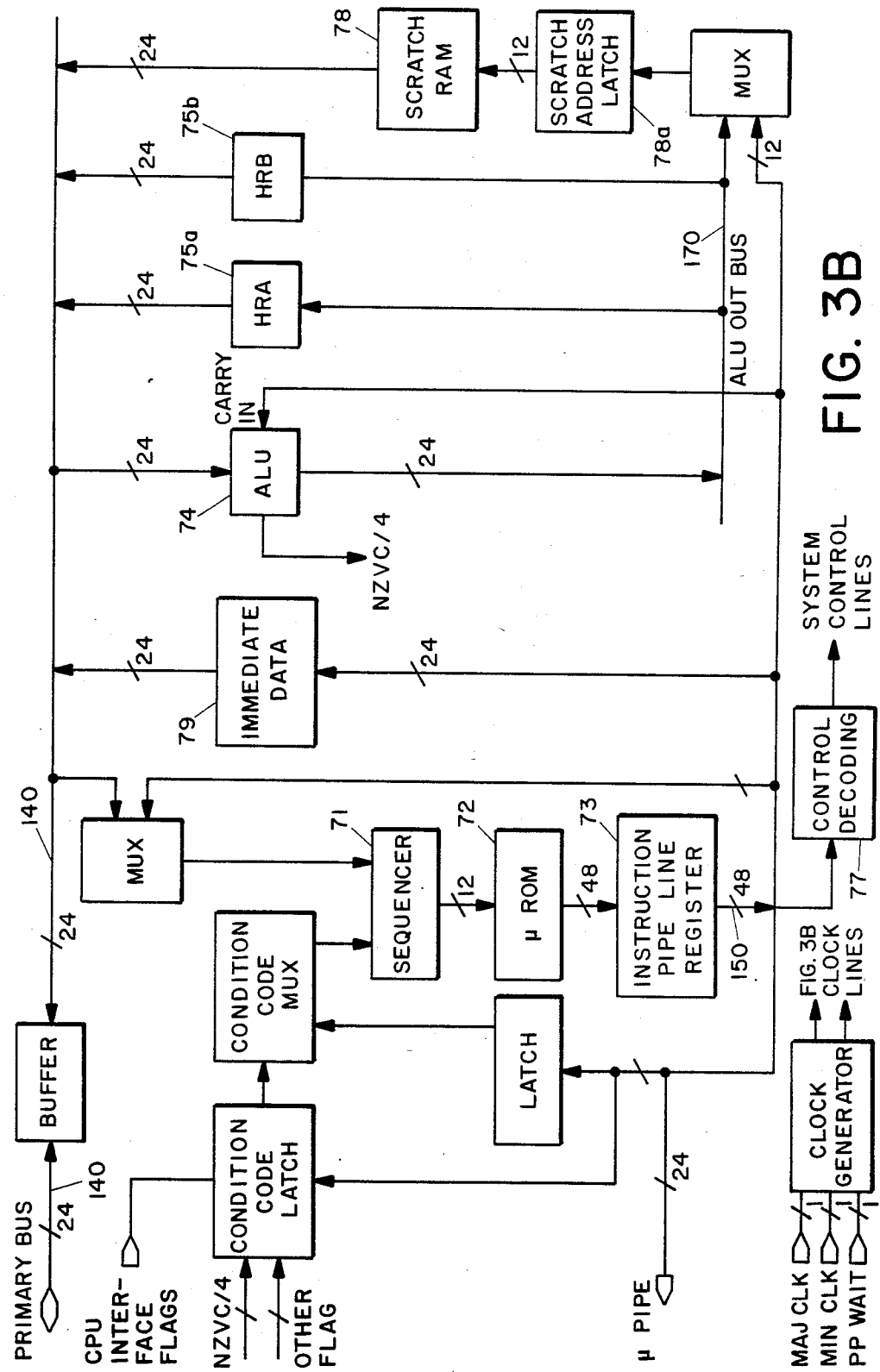
FIG. 3B is a block diagram of a micro-coded engine useful in the system of FIG. 2.

FIGS. 3A and 3B illustrate an implementation of a micro-coded engine utilizable in the raster system of FIG. 2. For ease of understanding, the following table of abbreviations is provided.

| Abbreviation | Explanation |
|---|---|
| Reg. | Register |
| μ pipe | pipeline register 73 or its output |
| PP Wait | Picture (Display) Processor Wait |
| MUX | Multiplexer |
| NZVC | Negative; Zero; Overflow; and Carry |
| HRA | Holding Register A |
| HRB | Holding Register B |
| μ ROM | Micro ROM, referring to where the micro |

| Abbreviation | Explanation |
| --- | --- |
| ALUOUT BUS | code is stored. The output bus of arithmetic logic unit 74. |

It will be appreciated that the coding of the microcoded engine to perform the various functions depicted herein is well within the skills of the average practioner in this art, and such an exercise thus is not detailed herein. For a more complete understanding of microcoded engines and implementing same, see, for example, the following publication: Build a Microcomputer, Chapter II, Microprogrammed Design, Advanced Micro Devices, 1978, AM-Pub 073-2.

The micro-coded engine of FIGS. 2 and 3B is comprised of micro-sequencer stage 71 (e.g. a 2910 of Advanced Micro Devices, Inc.), connected to both pipeline bus 150 and primary bus 140 on the one hand, and to an instruction ROM 77 (eg 4K×48) on the other hand, with the latter being coupled to pipeline register 73. Included also are an arithmetic logic unit (ALU) 74, eg six 2901's commercially available from Advanced Micro Devices, Inc. input connected to both the primary and pipeline buses, an auxiliary RAM 78 (e.g. 4K×24) with address block 78a, input coupled to the pipeline bus 150 and connected to the primary bus 140, an immediate data buffer 79 similarly connected to the pipeline and primary buses, and holding registers 75. The holding registers 75a and b communicate with the primary bus and in addition are in communication with the ALU 74 via ALU output bus 170. Although not specifically illustrated, the registers 75, as is the case with regard to most of the other blocks in FIG. 3B, receive control signals in conventional manner from control decoding block 77.

With reference again to FIG. 2, there is illustrated in block diagram form the display system line smoothing capability 80 interconnected with the system's micro-coded engine 70 on the one hand (to comprise the display processor 100) and the frame buffer 200 on the other hand. As shown, move and draw commands from the CPU memory interface are coupled to the micro-coded engine 70. Initial X-position information is sent to the X counter portion 210 of the frame buffer stage 200 over line 111, and initial Y-position information is sent to Y-position counter 205 over line 112. As stated before, the frame buffer stage 200 outputs to the display over lines 215.

The microcoded engine orchestrates the smooth line drawing task, along with performing miscellaneous other duties such as erasing the screen. It reads MOVE, DRAW, and SET LINE COLOR commands from a display list stored in the CPU's memory. On a SET LINE COLOR command, for example, it loads the new line color value into register 181 of the proportional weighting block 180, shown in FIGS. 2 and 8. On a MOVE command, the microcoded engine loads the new coordinates (starting position of the next line) into the X and Y counters 205 and 210 of the Frame Buffer 200. On a DRAW command, it performs setup operations including calculation of delta X (DX), delta Y (DY), slope, and octant values, and loading of registers inside the line smoothing block 80. These operations are defined in greater detail later.

The line smoothing section 80 is comprised of a digital differential analyzer stage 130, connected to micro-coded engine 70 via line 113, an anti-aliasing value generator 160 connected to analyzer stage 130 via line 154 and to the micro-coded engine 70 via line 114, and a proportional weighting stage 180. Generator 160 outputs alpha ($\alpha$) value information on line 177 to the proportional weighting stage 180 and step control information on lines 178 to the X and Y counters 205,210 of the frame buffer (lines 178b and 178a respectively). Proportional weighting stage 180 is connected to the micro-coded engine by line 117 and has its output coupled to the frame buffer 200 via line 194.

In the operative scheme depicted in FIG. 2, in order to reconstruct a line in raster format, a digital differential analyzer (DDA) is utilized, in this case DDA unit 130. For each incremental step of the DDA along the large axis, small axis position information is generated for every pixel in the line. Because of the fixed location of the raster pixels, the equivalant line would have a jagged or stairstep structure in most orientations in the absence of a suitable and effective line smoothing or anti-aliasing capability. With the DDA 130 operating at a higher resolution than the raster screen resolution, the distance between the theoretical line and the individual pixel positions of relevant pixels can be resolved. This so-called small axis distance information associated to each relevant pixel, together with information in binary form representing the slope of the line to be recreated, can be utilized in generator 160 to generate a "gray scale" value to be assigned to each relevant pixel. The value generator is provided with the capability of assigning gray scale values to sets of pixels, each set comprising a single dimension array, when the array gives representative cross-section of the theoretical line for the incremental position of the DDA 130 regardless of the orientation of the line to be recreated relative to the horizontal (X) and vertical (Y) axes. The arrays of pixels thus comprising the center portion of the given line make the line appear to pass between screen pixels, with the result that the stair-step appearance is minimized.

In this way smoothing is accomplished perhaps 1000 times faster than in a pure software arrangement and during the building of the raster image itself, thus requiring no after-filtering. The use of the slope information in the generation of the gray scale values, on a pixel-by-pixel basis, enables effective minimization of changing line thickness appearances with different line orientations.

The unique arrangement of DDA 130 enables the calculation of small axis positions to n bits of fraction, for integral steps along the large axis, while using only a single clock cycle per step. As such it can be thought of as an advance over say Bresenham's DDA Algorithm (found in "Principles of Interactive Computer Graphics", by William Newman and Robert Sproull, Second Edition, pp. 25-27, McGraw-Hill, 1979) on a fractional pixel grid, which requires $2^n$ cycles to move one pixel in X.

The pixel-by-pixel values generated by unit 160 for the fractional coverage of each pixel by the line being drawn, i.e. the alpha values, may be used to calculate new values for the display pixels via proportional weighting unit 180. The function of unit 180 is particularly effective in handling situations where lines cross and are sequentially drawn, and some intelligent balancing of intensities, and color for color systems, is desirable at the point of intersection. Where such a balancing function is considered dispensible, the alpha values from generator 160 can be input directly to the frame buffer stage.

The technique of proportional weighting in accordance with the present invention, involves utilization of the alpha value generated, the old or present pixel value as found in the frame buffer stage and the desired color for the line being drawn, at say the point of intersection with another line. For monochrome systems, this latter aspect is not considered. This technique is in contrast to present known systems and algorithms wherein the old pixel value is simply ignored, or is used in a maximum value operation with the alpha value times the line intensity. This maximum value operation is known only for a monochrome arrangement, wherein the effect is to write the new pixel only if it is larger than the old value. In the known prior arrangements, the average errors are greater than proportional weighting, as viewed against the ideal case.

Figure 2A:
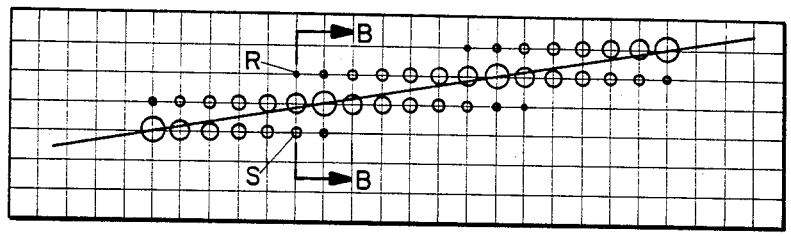
FIG. 2A is a graphic illustration of line smoothing in accordance with the invention by varying the intensity of each pixel of each 3-pixel array encompassing the center portion of the line to be drawn.
Figure 6:
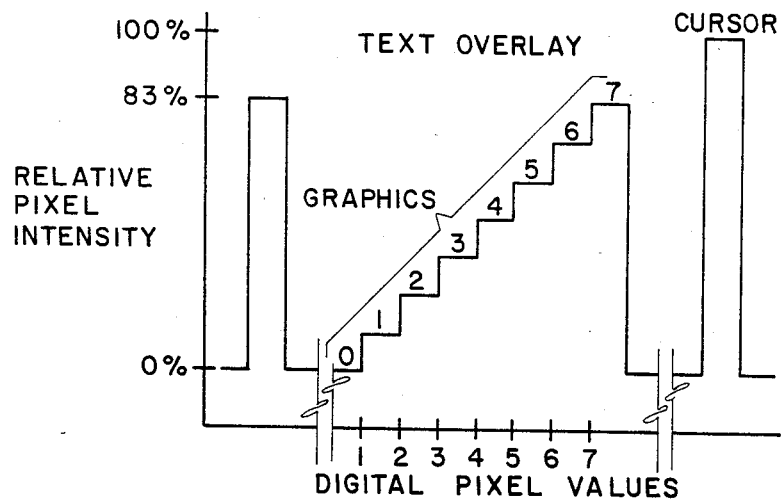
FIG. 6 is a graphical representation of a pixel intensity gray scale employable in the system of FIGS. 2 and 5.
Figure 4:
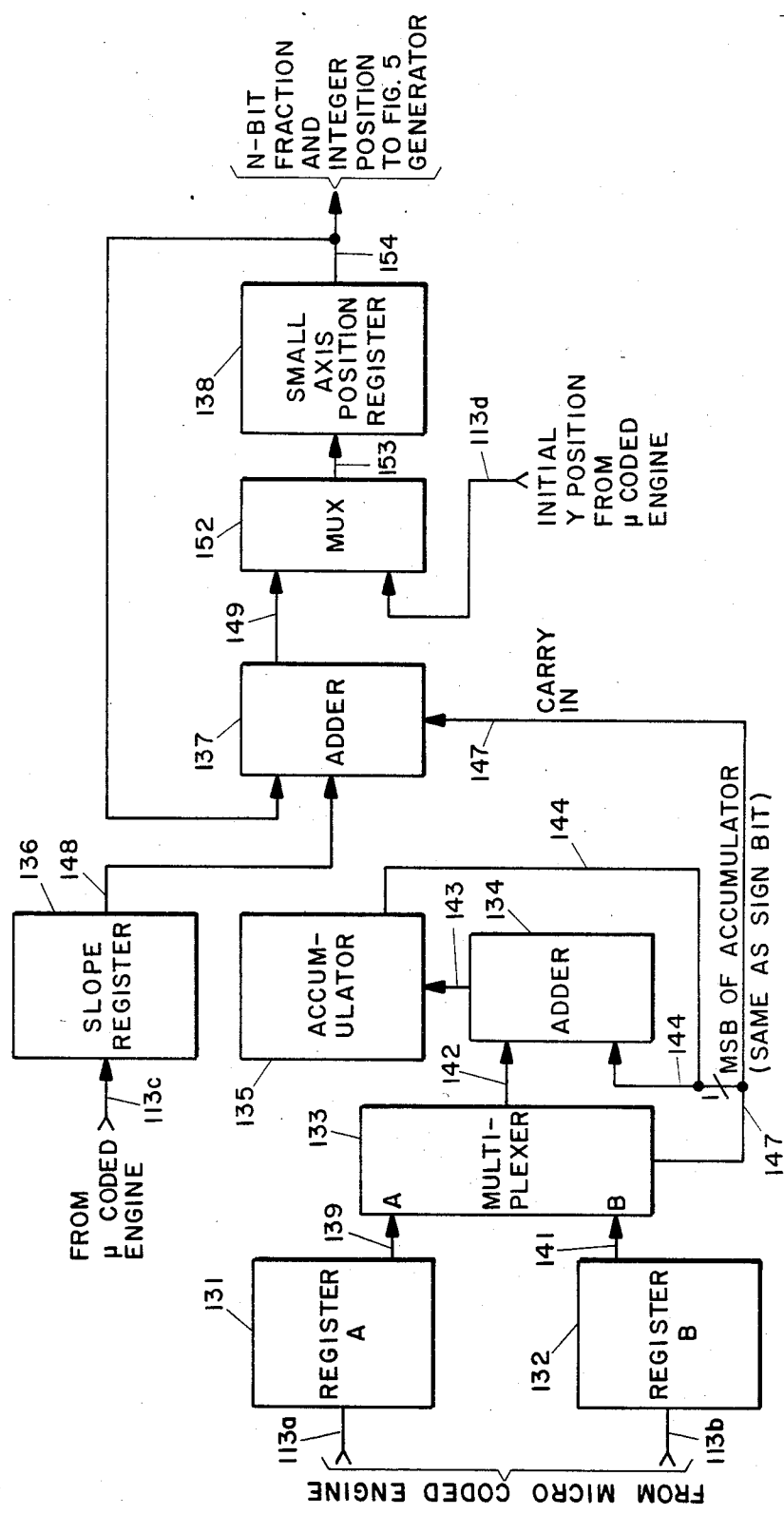
FIG. 4 is a block diagram illustrating a digital differential analyzer arrangement of the raster scan system of FIG. 2, in accordance with the invention.

Referring to FIG. 4, there is illustrated a hardware implementation of a digital differential analyzer in accordance with the invention for reconstructing a line in raster format. For ease of description, the generation of a line in the first octant (0 to 45 degrees) will be discussed here (where the X axis represents 0 degrees and the Y axis 90 degrees). The octants other than the first are obtainable through 90-degree rotations and reflections, as is demonstrated herein. Basically, with reference to FIGS. 2A and 2B, on lines of 45 degrees or less (i.e., first octant) from the horizontal (X axis), a set of three pixels in a vertical (small axis) array will be issued for every X (large axis) position of the processor along the center portion of the line. The gray scale (see FIG. 6) to be assigned to each individual pixel within each array is a function of the small axis distance from the actual line.

Figure 2B:
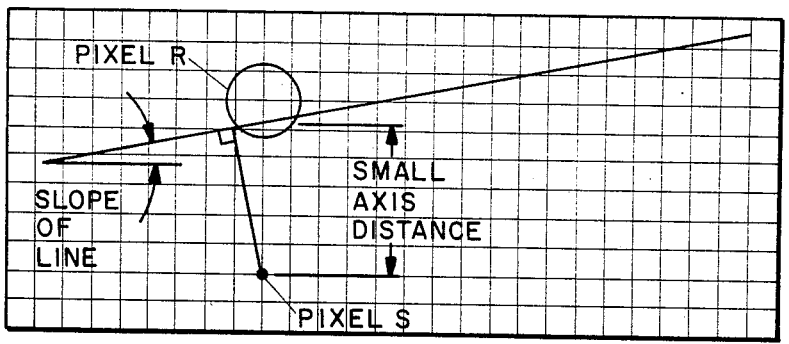
FIG. 2B is a blow up of one such array taken at B—B of FIG. 2A and illustrating the geometric relationship between the line to be drawn and the fixed pixel positions.

With reference to FIG. 2B, the true distance from pixel S is the small axis distance (in this case of a first octant line orientation, the Y-axis distance between the particular pixel position and the line to be drawn) times the cosine of the angle the line makes with the large (X)axis. Thus, with a first octant line orientation the small angle between the line and the horizontal is used, and the arrays of pixels will be vertical. If the line to be drawn was to have a second octant orientation, the angle to be used would be the small angle between the line and the vertical axis, and the array of pixels for each DDA increment will be horizontal.

The arrangement of FIG. 4 is designated for rapid smooth line generation involving the calculation of the small axis positions of a line to fractional pixel precision for integral steps in the large axis position. In this arrangement DX and DY are defined to be the difference between the ending and starting X and Y coordinates for the line to be drawn. Of course, by assuming the line to be in the first octant orientation, $DX \geq DY \geq 0$. Slope is defined herein to be the greatest integer less than $2^n$ times DY/DX (or zero if DY=0), with the number of bits of fractional pixel small axis (Y) precision being n. Thus, Y can, for example, be expressed in terms of sixty-fourths of the actual distance between the fixed pixel locations.

In FIGS. 4, A and B registers 131, 132 are input coupled to the micro-coded engine via lines 113a and 113b respectively. The outputs of the A and B registers, on lines 139, 141 lead to the A and B inputs of a multiplexer 133. The output of multiplexer 133, on line 142, is connected to adder stage 134. Adder 134 in turn is connected to an accumulator 135 via line 143.

The output of the accumulator is routed back as an input to adder 134 via line 144. The sign bit of the accumulator is coupled to the select control of multiplexer 133 and the carry in bit of a second adder stage 137 via line 147. Adder stage 137 receives one input from slope register 136 via line 148. The slope information has already been calculated by and is received from the micro-coded engine, over line 113c.

Adders 134 and 137 may in practice be combined into a single adder stage with the respective adding operations sequenced.

The output of adder 137 on line 149 is input to small axis position register 138 via multiplexer 152 and line 153. Small axis position register 138 receives the initial Y position information from the micro-coded engine via line 113d, multiplexer 152 and line 153. Register 161 of FIG. 5 also receives the initial small axis position of the line to be drawn, from the micro-coded engine 70 over line 114. The output of small axis position register 138 on lines 15, is in a binary form, a portion of which constitutes the n-bit fraction and the remainder the integer position. This information is fed to the alpha value generating arrangement of FIG. 5, and routed back as the second input to adder stage 137. It is noted that the integer position of the output of small axis position register 138 could be directly input to the appropriate frame buffer counter (see FIG. 2).

To start a line, the five registers 131, 132, 135, 136 and 138 can be loaded as follows for a first octant situation:
Slope Register: The slope as calculated hereinabove
Y (small axis)—Position Register: Initial Y (small axis) position
Register A: (Slope times DX) $-(2^n$ times DY)
Register B: Register A+DX
Accumulator: Register A=DX/2 Truncated The accumulator 135 and the small axis position register 138 are then clocked synchronously for as many cycles as there are pixel steps in the large axis (X) direction for the first-octant orientation line to be drawn. DX and DY may include fractional pixel precision in a fixed point format, since this may be thought of as being identical here to integers with more bits.

The resultant of the arrangement of FIG. 4 is the calculation of small axis positions to n bits of fraction, for integral steps in large axis position. This is accomplished via only a single clock cycle per step, with the only active elements in this operation being adders and multiplexers (i.e. no multiplication or division etc. steps or other more complex operations being performed). Alternatively, one would have to perform, for example, Bresenham's DDA algorithm on a fractional pixel grid, which would result in $2^n$ cycles to move one pixel along the large axis.

Figure 5:
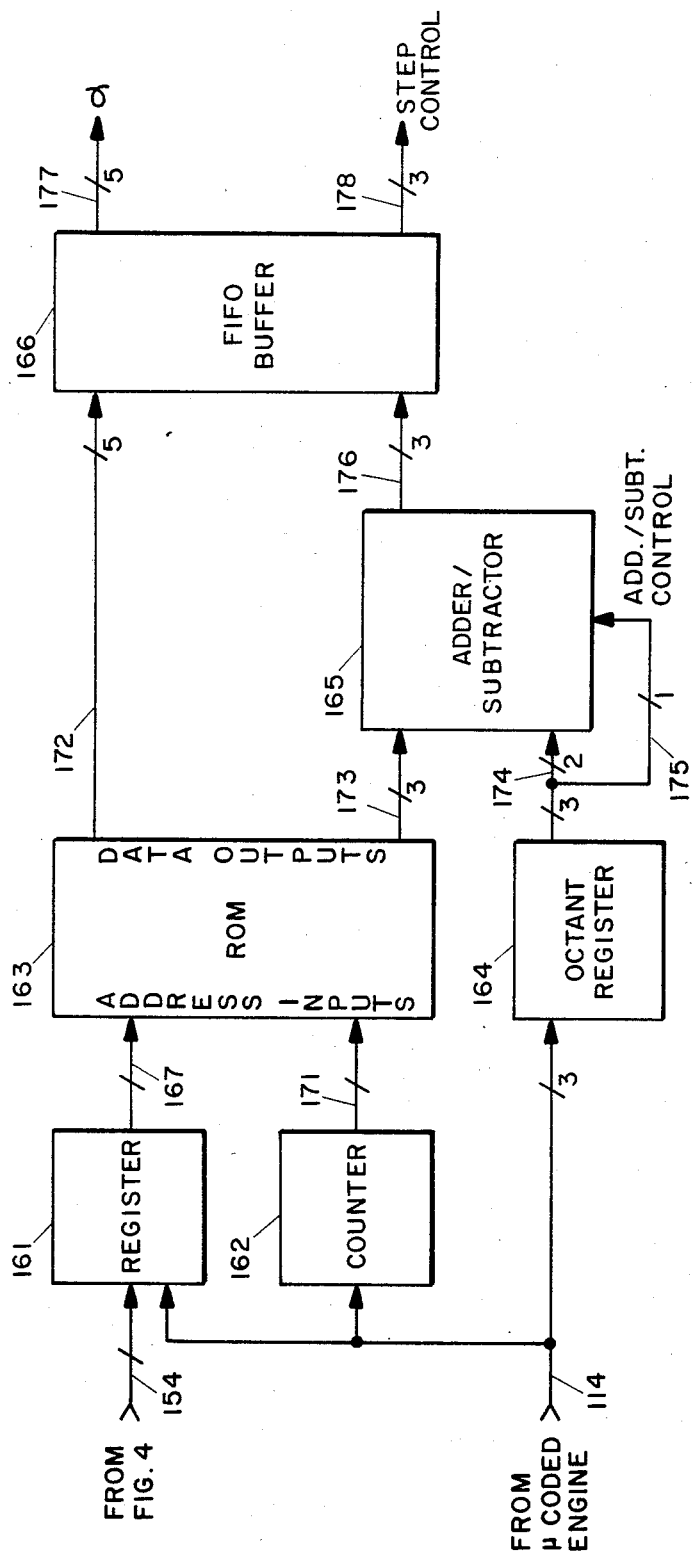
FIG. 5 illustrates in block form an anti-aliasing value generator arrangement for the system of FIG. 2, in accordance with the invention.

Referring now to FIG. 5 there is illustrated a hardware arrangement for generating the alpha values, i.e. the pixel-by-pixel values representing the fractional coverage of each pixel by the line being drawn, and step control commands for effecting the 3-pixel array coverage of the center portion of the line to be drawn for each position along the large axis.

The fractional portion and the LSB of the integer portion of the output of small axis position register 138 in FIG. 4 are received by register 161 on line 154. They are fed as address inputs over line 167 to a ROM 163 housing a suitably generated look-up table, with the alpha information being output over line 172 to a FIFO (first-in, first-out) buffer 166. The remaining data output, i.e., line 173, is connected to adder/subtracter stage 165, whose output in the form of step control commands is in turn coupled via line 176 to the FIFO buffer 166. The respective alpha and step control outputs of FIFO buffer 166 are presented on lines 177 and 178.

Information with reference to the octant orientation of the line to be drawn is received from the micro-coded engine over line 114 by octant register 164, with the LSB (least significant bit) of the register contents being applied to adder/subtractor 165 via line 175 as a control dictating whether stage 165 is to add or subtract the two inputs thereto on line 173 and 174.

The essence of the arrangement of FIG. 5 comprises the ROM 163 look-up table, with autosequencing capability. For a better understanding of the process for determining table values for high resolution smooth image (in the instant case "lines") generation, see e.g. the article by John E. Warnock entitled "The Display of Characters Using Gray Level Sample Arrays", found in SIGGRAPH Conference Proceedings, Association for Computing Machinery, Inc., 1980, pp 302–307.

The ROM provides the alpha values as well as the direction to step to reach this pixel from the last one. There are three bits of step control to allow moving to any of the eight possible adjacent pixels. Before drawing a line, the coordinates (rounded to the nearest pixel) of the starting position are loaded by the micro-coded engine into the X and Y counters 210, 205 of the Frame Buffer System 200 (FIG. 2). After that, only increment and decrement commands are used to step through the line. All pixels touched by a line (those with non-zero alpha) can be traversed in a continuous chain of adjacent pixels. When it is more convenient for building tables to skip over some pixels, an alpha value of zero can be used to avoid modifying the pixels.

To save on table size, in the depicted embodiment the ROM always works in the first octant (0 to 45 degrees). The octant register 164 and adder/substracter 165 take care of the 90-degree rotations and reflections necessary to draw in the other 7 octants. This is accomplished by modifying the step commands on line 173. A table of octant register values and associated adder/subtracter operations are shown in FIGS. 7A–7C.

The first operation that the micro-coded engine performs in effecting the drawing of a smooth line is to determine the octant orientation of the line (i.e. the octant in which the line lies) and to load the value of that octant into the octant register 164.

As mentioned, the inputs to the ROM 163 are register 161 over line 167 and counter 162 over line 171. In the simplest version, the register is loaded from the picture or display processor (PP) and the counter is cleared at the beginning of each section of the line to be drawn. In general, each line section (defined below) will write from three to sixteen pixels, and it normally requires several sections to draw one line.

The sections are divided into three classes: Short vectors (less than say two pixels long), end points of longer vectors, and the middle pieces of longer vectors. For each of the three classes, the value loaded by the micro-coded engine into the register 161 is treated as group of smaller fields, each of several bits. The fields are different for the three classes, but are defined so that the register contents for the three classes are always distinguishable (do not overlap).

Short vectors are written as one section. The register 161 is split into 4 fields defined as: Fractional pixel bits (two in this version) of the X starting position (first octant assumption), same for Y starting position, delta X (difference between starting and ending X coordinates to two bits of fraction and one integer bit), and delta Y. These values are calculated by the processor, combined into one word and loaded into the register 161. The counter 162 is then used to sequence the ROM through enough steps to cover all pixels touched by this short vector. As mentioned above, the starting X and Y coordinates are rounded to integers (pixel locations) and loaded into the position counters on the frame buffer system before drawing the line.

Long vector end points are also written as one section. Here there are three fields in the register 161. Fractional pixel bits of the X and Y starting position as above, and the slope of the line (delta Y divided by delta X). It is between 0 and 1 because all work on the input side of the ROM is done in the first octant. It is truncated to say 5 or 6 fraction bits depending upon available ROM table size. With this information, the ROM is stepped enough times to cover all pixels proximate to this end of the line. Long lines are drawn in the natural order, starting with one end point, proceeding through the center portion, and finishing with the other end point. The procedure for the final end point is essentially identical to that of the first, except the opposite octant (180 degrees from the one used by the first end point and center portion) is loaded into the octant register 164.

Figure 9A:
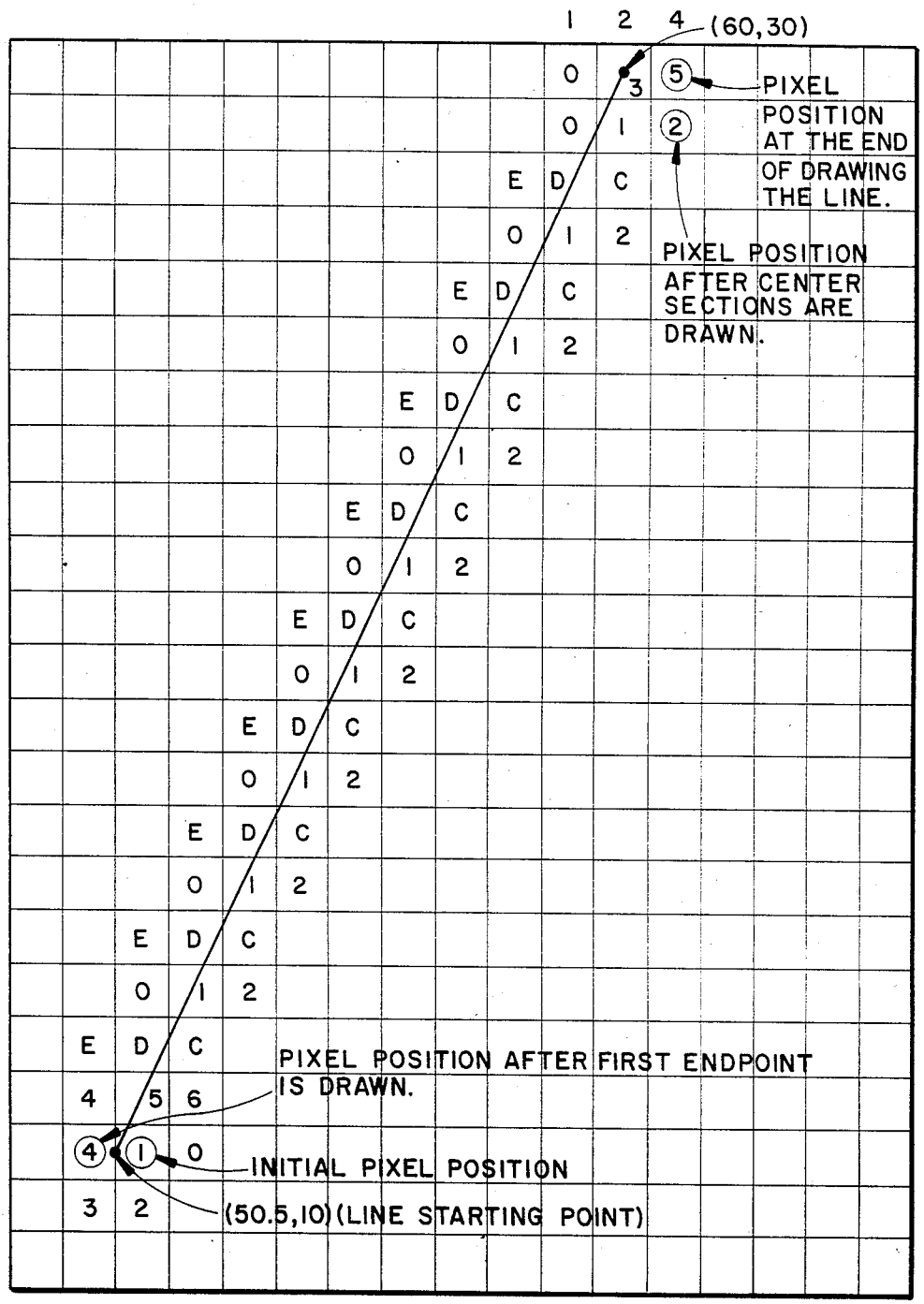

The center portion of a long line is drawn as many sections, each a cross-section of the line consisting of a vertical column of pixels. (The word "vertical" is used in reference to the input side of the ROM where lines are always in the first octant). The processor steps one vertical column to the next along the line from one point to the other. For each step, the processor (i.e. FIG. 4 arrangement) calculates the vertical (Y) position of the line to fractional pixel accuracy (6 bits in the example case). The register is split into four fields: The slope as above, but truncated to say three bits; the fractional pixel portion of the Y (small axis) position; a one bit value indicating whether the integer portion of the Y position has incremented between the last step and this one; and another one bit value that toggles for each new section. The slope and fractional Y position provide the information necessary to determine the alpha values for the pixels in the current column touched by the line. The Y (small axis) increment bit determines whether a step right or a step up and right (step 0 or step 1) command is needed at the beginning of the current section. The toggle bit controls whether this section steps from bottom up or top down along its column of pixels. In this manner, the pixel address zig-zags along a line stepping up one column and down the next. See FIGS. 9A–9E and in particular FIGS. 9A and 9B, though these figures depict a line in the second octant.

The 5 bits of alpha and 3 bits of step control are buffered in the 8-bit FIFO (first-in, first-out) buffer 166. This allows the line smoothing arrangement to generate commands at its maximum rate, which is faster than the frame buffer system 200 can execute them. The frame buffer system can then continue to empty the FIFO buffer while the processor is fetching and setting up the next line.

The values in the ROM 163 look-up table may be generated by a general purpose computer. Any desired accurate software algorithm for generating smooth lines may be used. Several have been published, as referenced hereinbefore. For each class of sections, and for each possible register value within that class, an appropriate line may be generated by the chosen algorithm.

In the present invention, the alpha values for the appropriate section of the line are written into the ROM, along with a sequence of step commands to traverse the proper pixels. With this procedure, the system will generate virtually identical line profiles as the general purpose computer algorithm chosen, except at much higher speeds.

Figure 7:
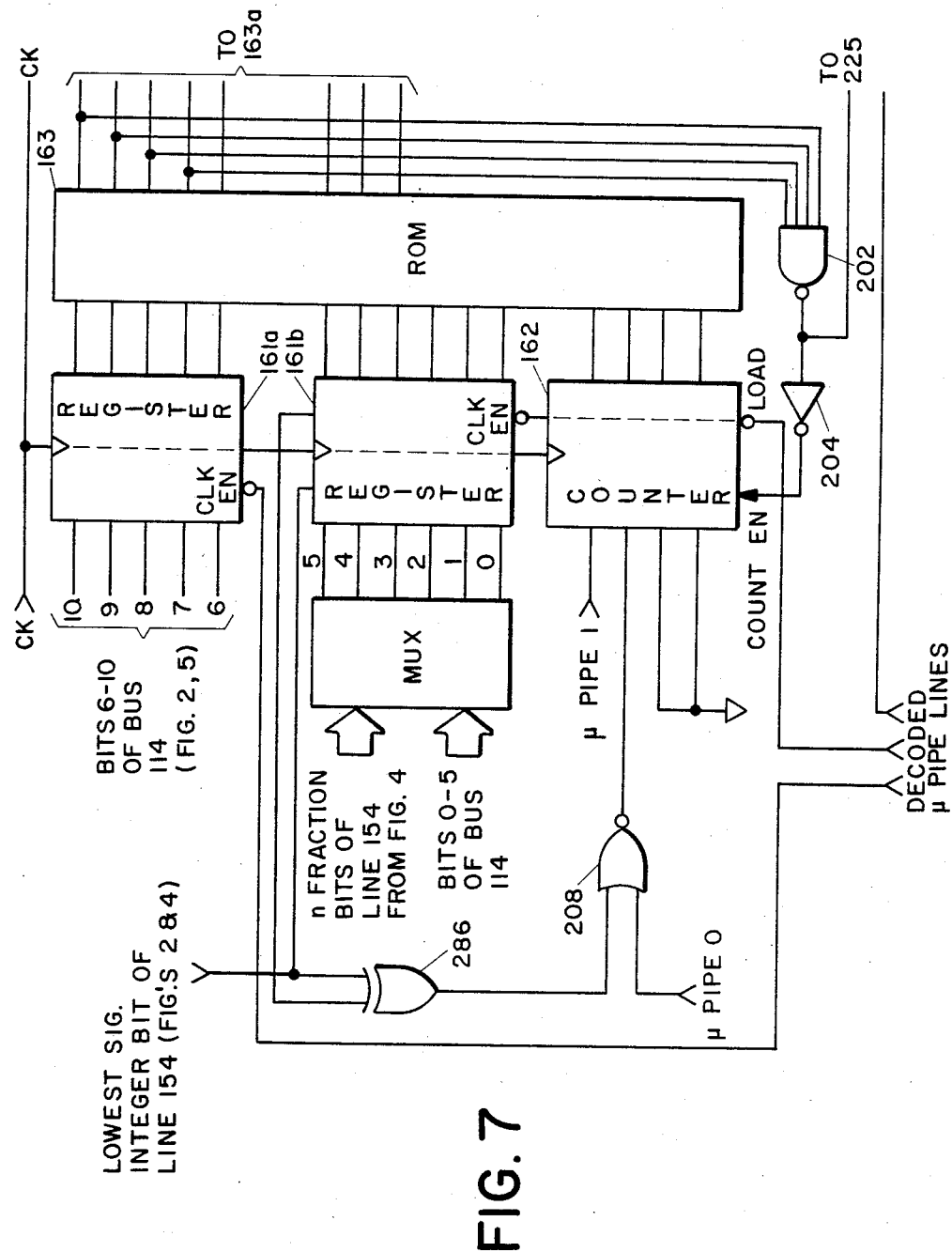
FIG. 7 is a schematic block diagram illustrating in greater detail the system of FIG. 5.
Figure 7:
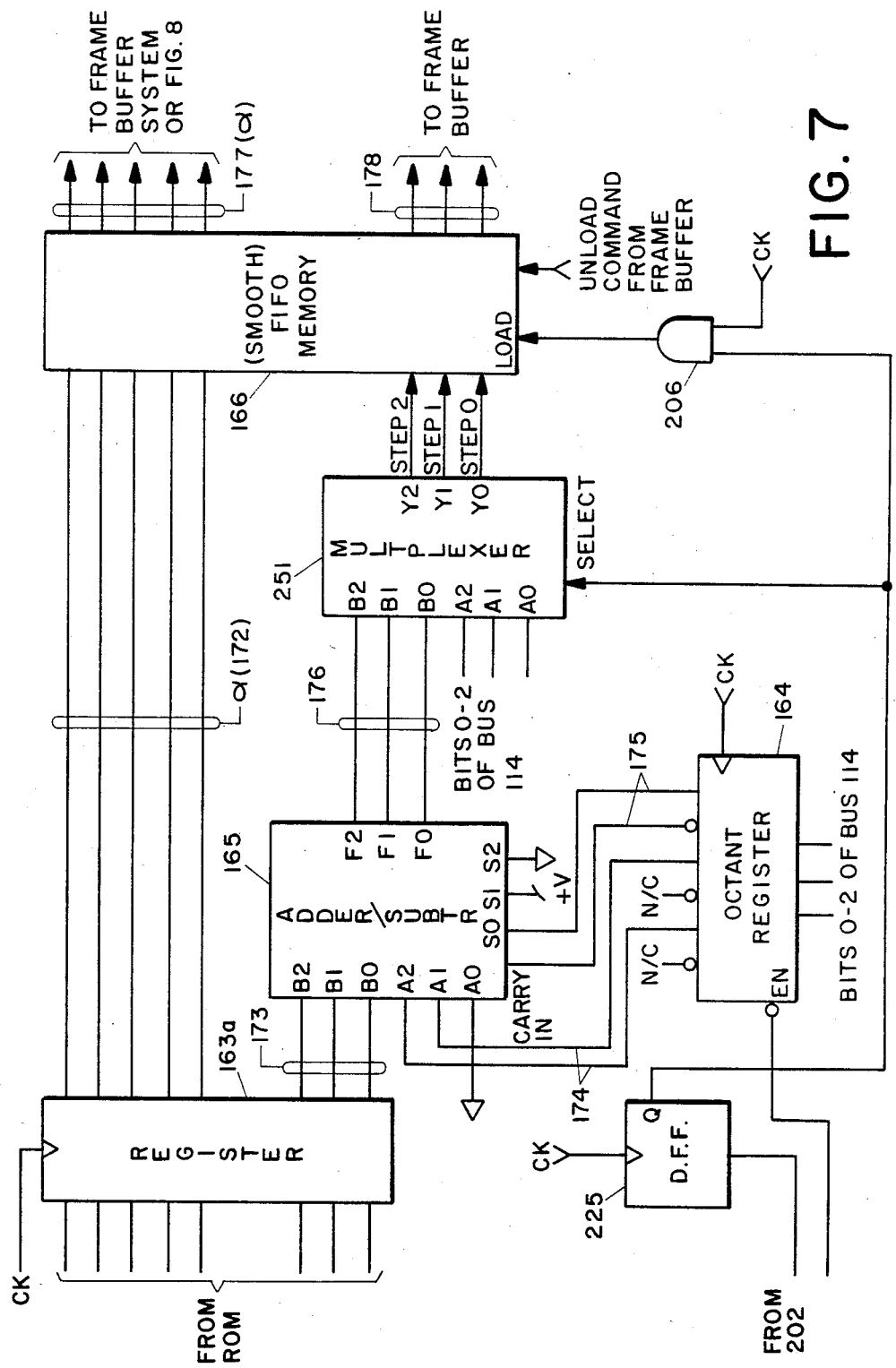

FIG. 7 illustrates in a schematic block diagram the arrangement depicted in FIG. 5 in a more specific form. In the embodiment of FIG. 7 blocks 161a and 161b comprise the register 161 of FIG. 5 and blocks 163, 163a comprise the ROM. Additional components are provided in the form of gates 202, 206, 208 and 286, flip-flop 225 and inverter 204.

In the arrangement of FIG. 7, though not particularly shown, suitable logic can be constructed to operate between register 163a and adder/subtractor 165 to provide the user with a capability for selecting any desired number of 3 or more pixels to comprise each array making up the center portion of the line to be drawn.

The following table more specifically identifies the various blocks of the arrangement of FIG. 7.

| Block Identification | Function | Commercial Identific. |
|---|---|---|
| 161a | 6-bit register with clock enable | LS378-TI |
| 161b | 8-bit register with clock enable | LS377-TI |
| 162 | 4-bit counter with parallel load & count enable | LS169-TI |
| 163 | 32K by 8 ROM | 27256-INTEL |
| 163a | 8-bit register | LS374-TI |
| 164 | 4-bit register with clock enable | LS379-TI |
| 165 | 4-bit ALU | LS382-TI |
| 166 | FIFO memory | LS224(2)-TI |
| 225 | D Flip-flop | LS74-TI |
| 251 | Quad 2 1 multiplexer | LS157-TI |

Figure 8:
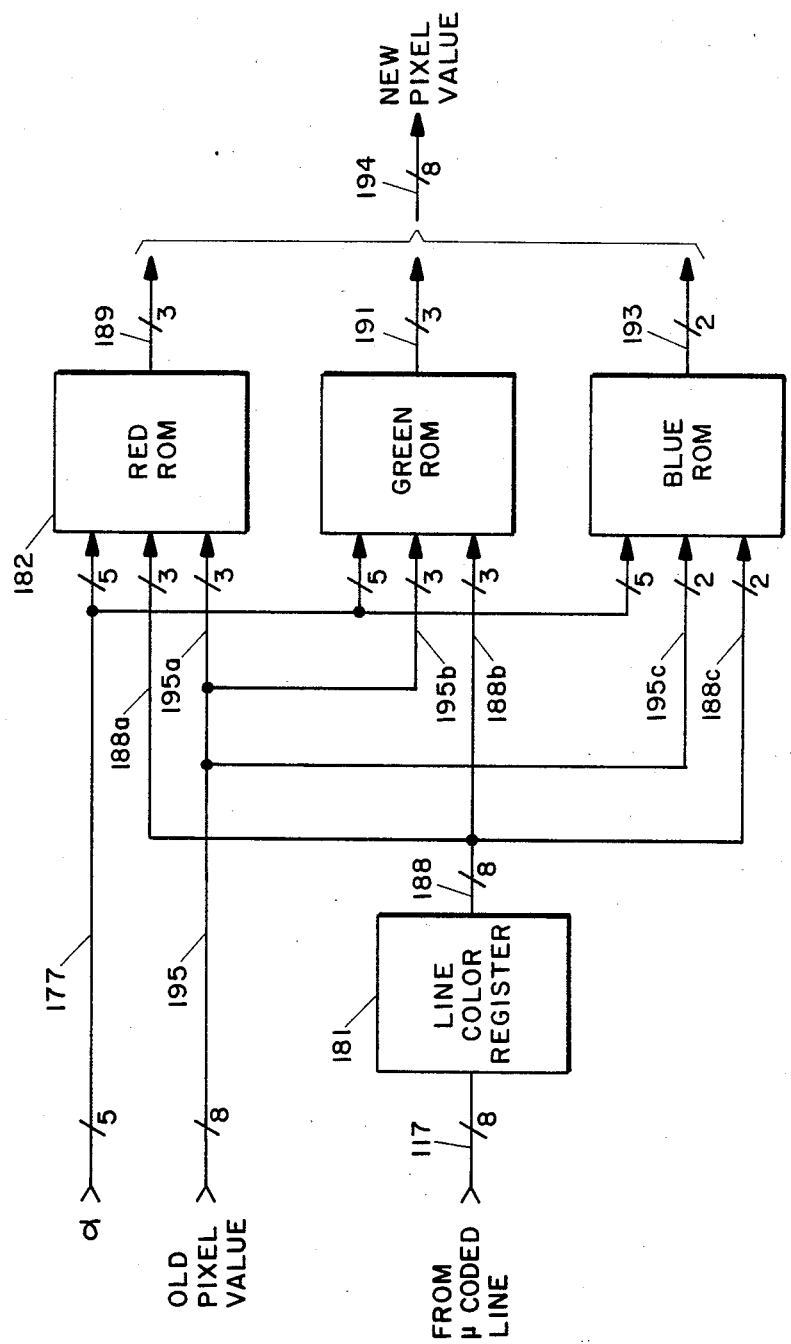
FIG. 8 is a block diagram illustrating a proportional weighting function operable in the system of FIG. 2.

In the construction of a near perfect smooth lined image on a display of the raster type, knowledge of each line crossing a given pixel is necessary before determining that pixel's intensity, or its color in a color system. Such a system would, however, be unacceptably slow. The proportional weighting arrangement of FIG. 8 depicts an approximation process that allows sequential (and therefore high speed) traversing of the lines (as is usually the case in connection with jaggy displays). By this approximation process, pixels covered by only one line to be drawn, or by two lines which have edges at 90 degrees to each other, would be set precisely to the proper value of intensity, and color, although pixels partially covered by lines at more or less than 90 degrees will tend to appear to be covered more or less, respectively, than they should be. This latter consideration is, however, to be viewed in comparison to state-of-the-art maximum value or so-called unconditional replace arrangements which provide at least twice the average error of the present invention.

The arrangement of FIG. 8 is a color system implementation comprising three ROM's 182-184 and a line color register 181. The alpha values as generated by the arrangement of FIGS. 5 and 7 are input to FIG. 8 on line 177, specifically to ROM's 182-184. Each ROM is dedicated to one of the three primary colors of red, green and blue. The old pixel value (8 bits in this example) for the pixel at the location to be written is provided over line 195 from the frame buffer as a second input to each of the ROM's 182-184, specifically via leads 195a-195c. Finally, information (8 bits) regarding the desired color of the new line being drawn is provided from the micro-coded engine 70 (FIG. 2) to the line color register 181 via lead 117. The line color register output 188 represents (as is the case with the old pixel value input on line 195) the 8-bit input split into 3 bits of red, 3 bits of green and 2 bits of blue, which are forwarded to the respective-color ROM's 182-184 via lines 188a-c.

The combined outputs 194 of ROM's 182-184 constitute the new pixel value that is forwarded to the frame buffer.

In the case of a monochrome system, the line color register 181 and its input lead and outputs to the ROM's 182-184 are omitted. If it is desired to write monochrome lines of different line intensities, the line color register 181 is retained and is utilized as a line intensity register. Only one of the three ROM's 182-184 would be needed in the monochrome arrangements.

In the example system, smooth lines are drawn sequentially, i.e., one at a time, by the display processor. For each pixel touched by the line, there is calculated the alpha value, i.e., in its simplest form the fractional coverage of that pixel by the line. (It is noted that the alpha value can contain the effects of for example a special weighting function if such was part of the software algorithm used in generating the table values.) By the arrangement of FIG. 8, a new pixel value, both as to intensity and color, is generated, based on the old pixel value, alpha and the desired color of the line. This new generated pixel value is a proportional average of the old value and the line color, with alpha as the proportionality constant.

If IRO, IRN and IRL are allowed to be the "red gun intensities" for the old pixel value (line 195), the new pixel value (line 189), and the line color (line 117) respectively, then the following relationship can be carried out:

IRN=(alpha times IRL)+[(1-alpha) times IRO].

In practice, various values of alpha, IRO and IRL can be used to generate a look-up table which is loaded into red gun ROM 182, such that a 3-bit new pixel red intensity 189 is output as selected by the 3-bit value on lines 195 and 188a, and proportioned by the 5-bit alpha value on line 177.

The same procedure would, of course, hold for the green and blue colors and their respective ROM's 183 and 184.

The following is an operational description of the system herein depicted.

The user of the system decides to draw a smooth line from 50.5,10 to 60,30 (coordinates are given as X,Y). This command is sent from the host through the terminal CPU to the microcoded engine 70 (FIGS. 1 and 2). The microcoded engine calculates delta X (DX) to be 60−50.5=9.5, and delta Y (DY) to be 30−10=20. It further tests DX and DY to find DY>DX>0, implying a line in the second octant. A value of 2 (010 in binary) is, therefore, loaded into the octant register 164 of FIG. 7. This causes the adder/subtractor 165 to perform the operation: Step Control=2−ROM(163) Step Output, as listed in the table of FIG. 7C. The LSB of the binary 010 causes the subtraction; the top two bits specify the value to substract from, 2 in this case.

The microcoded engine 70 calculates the Slope according to the formula given hereinbefore in connection with the description of FIG. 4. The number of fraction bits (n) is 6, so $2^n$ is 64. Slope, as defined here, is the greatest integer less than $2^n$ time DX/DY. (Note that here the term DX/DY is used rather than DY/DX as in the discussion of FIG. 4 because this line is in the second octant). This becomes the greatest integer less than 64 times 9.5/20=greatest integer less than 30.4=30 (011110 in binary).

First Endpoint of the Line

The first pixels written to the screen will be for the starting endpoint. Note that endpoint positions may be specified to quarter pixel positions (two bits of fraction in X and Y) in this example of implementation. The integer rounding of the starting X position (51) is loaded into the X-address counter 210 (FIG. 2) on the Frame Buffer (FB), and the integer rounding of the starting Y position (10) into the Y-address counter 205. The two fraction bits of X and Y (binary 0.10 for X and 0.00 for Y) are appended to the five MSB's of the slope (binary 01111) to form a 9-bit word (01111 00 10). Two 1's are appended to the top end of this word to form an eleven-bit value (11011110010), which is loaded into the ROM input register 161 of FIGS. 5 and 7. The two 1's at the top of the word address the section of the ROM table used for line endpoints, which could have been assigned any 2-bit number. The counter 162 of FIGS. 5 and 7 (4 bits in this implementation) is loaded with 0, and then incremented once for every pixel touched by this endpoint of the line. (See next paragraph regarding determining when enough increments have occurred.) The FIFO 166 is loaded with a step and alpha value before each increment of the counter 162. The FB's interpretation of each step and alpha command is to first step the X and Y counters appropriately, and then store a new pixel value at the location addressed by the counters using the "update" arrangement of FIG. 8. Thus the step happens first, then the pixel read-modify-write. (The tables could readily be modified to handle the opposite order.)

Refer now to FIGS. 9A–9E. For the purpose of this discussion, assume the FIG. 7 implementation. Five bits of alpha are generated, where 0 through 29 (binary 00000 through 11101) are divided evenly to represent alpha values between 0 and 1. Values 30 and 31 (binary 11110 and 11111) are reserved to indicate the end of a section. In the case of this first endpoint, where 5 pixels need to be drawn (FIGS. 9A and 9B), the alpha value will become 31 on the fifth step of the counter 162. This disables further stepping of the counter 162 and FIFO 166, and sets a flag indicating the end of this section, which the microcoded engine 70 can read and test. At the conclusion of drawing the first endpoint, the step commands leave the FB counters 205, 210 (FIG. 2 and FIG. 9A) one pixel to the left of (below for the first octant) the rounded starting position of the line, ready for the zigzag path along the center sections of the line.

Center Sections of the Line

A value of binary 10 is appended with the 3 MSB's of the slope (binary 011) to form the 5-bit value (binary 10011) which the microcoded engine 70 loads into the upper 5 bits of the ROM input register (i.e. 161a). This value remains constant for the entire center portion of the line. The initial X position (instead of Y since in the second octant) is incremented by one half (add binary 0.100000, as if it were going to be rounded, but without performing the truncation) and loaded into the small axis position register 138 in FIG. 4. This X position is aligned so as to have 6 fraction bits, of which 4 are always initially zero because endpoints are specified to only quarter pixel precision. For this example the value will be 50.5+0.5=51 (binary 110011.000000). One half is added to the value being loaded into the small axis Position Register in order to make the integer portion of that register always contain the rounded position to the nearest pixel. The fractional portion of the small axis position register 138 is loaded into the lower 6 bits of the ROM imput register (i.e. 161b) of FIG. 7 via a multiplexer. The seventh bit of the register 161b, which does not go directly to the ROM 163, is loaded with the bottom integer bit of the small axis position register 138.

If the Y starting position (X for the first octant) had not been an integer, it would have been moved up to the next integer value before starting the center piece of the line. The X starting position would also be adjusted appropriately, by adding (the amount added to Y) times the SLOPE/64.

Figure 9B:
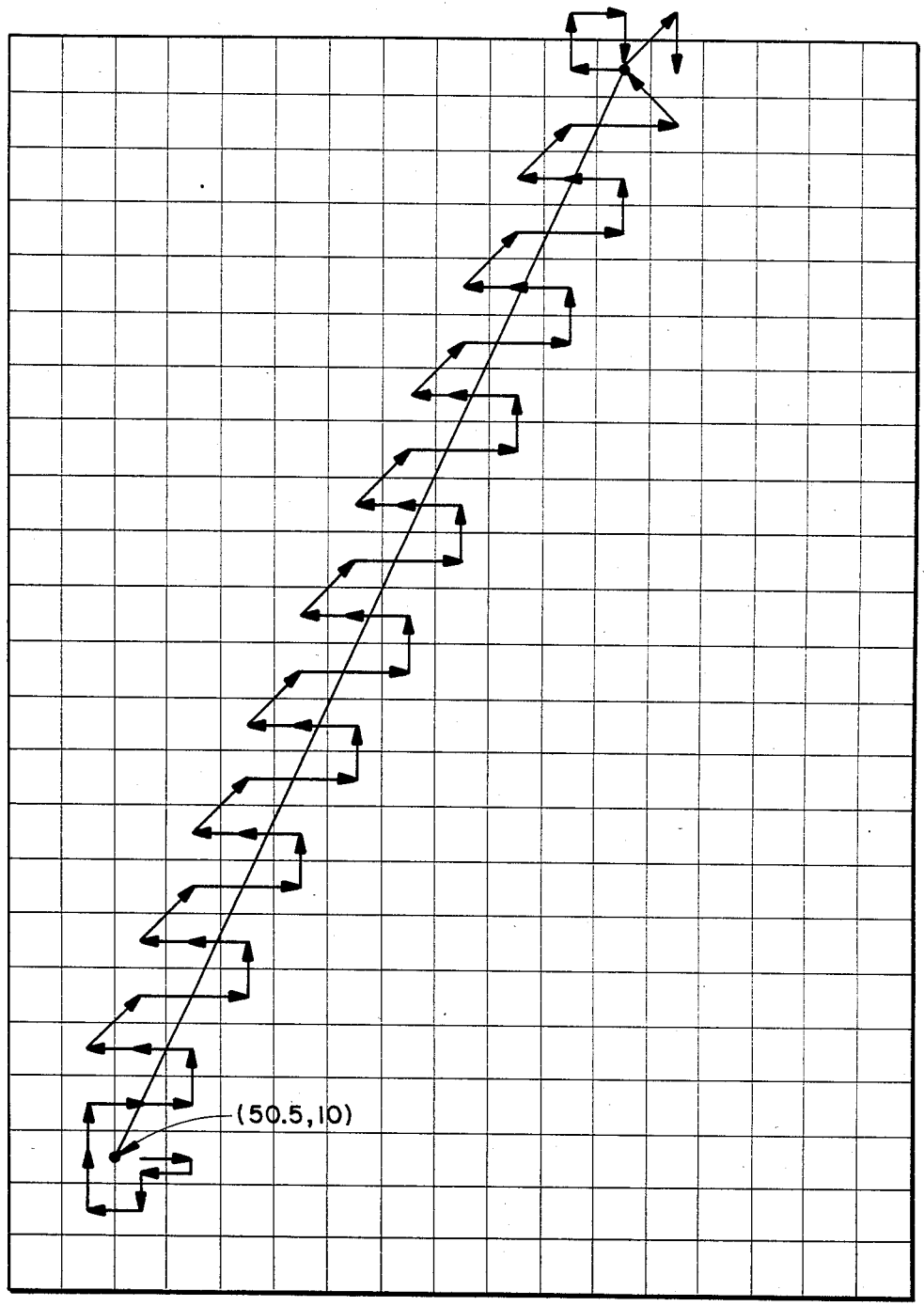
Figure 9C:
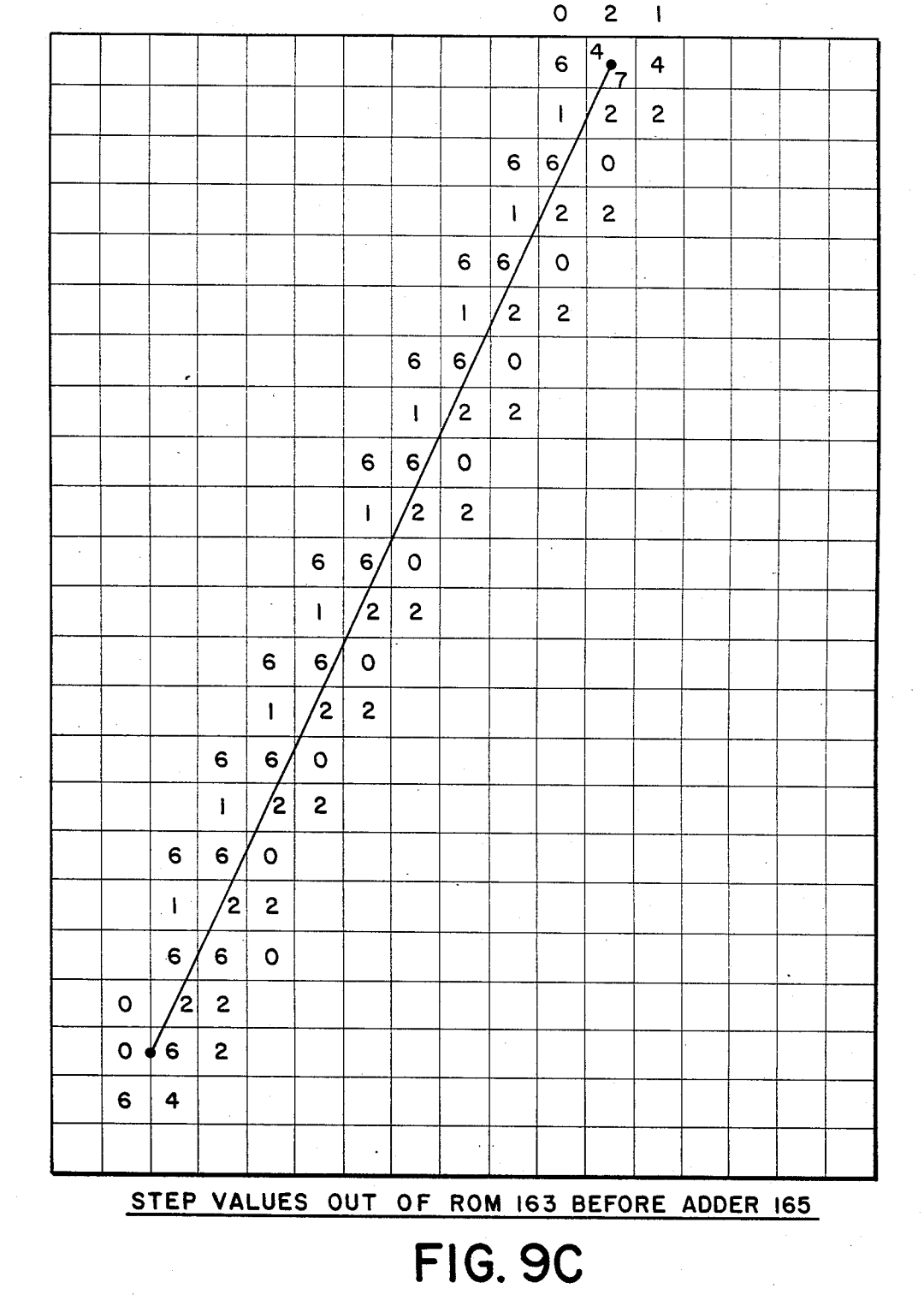
Figure 9E:
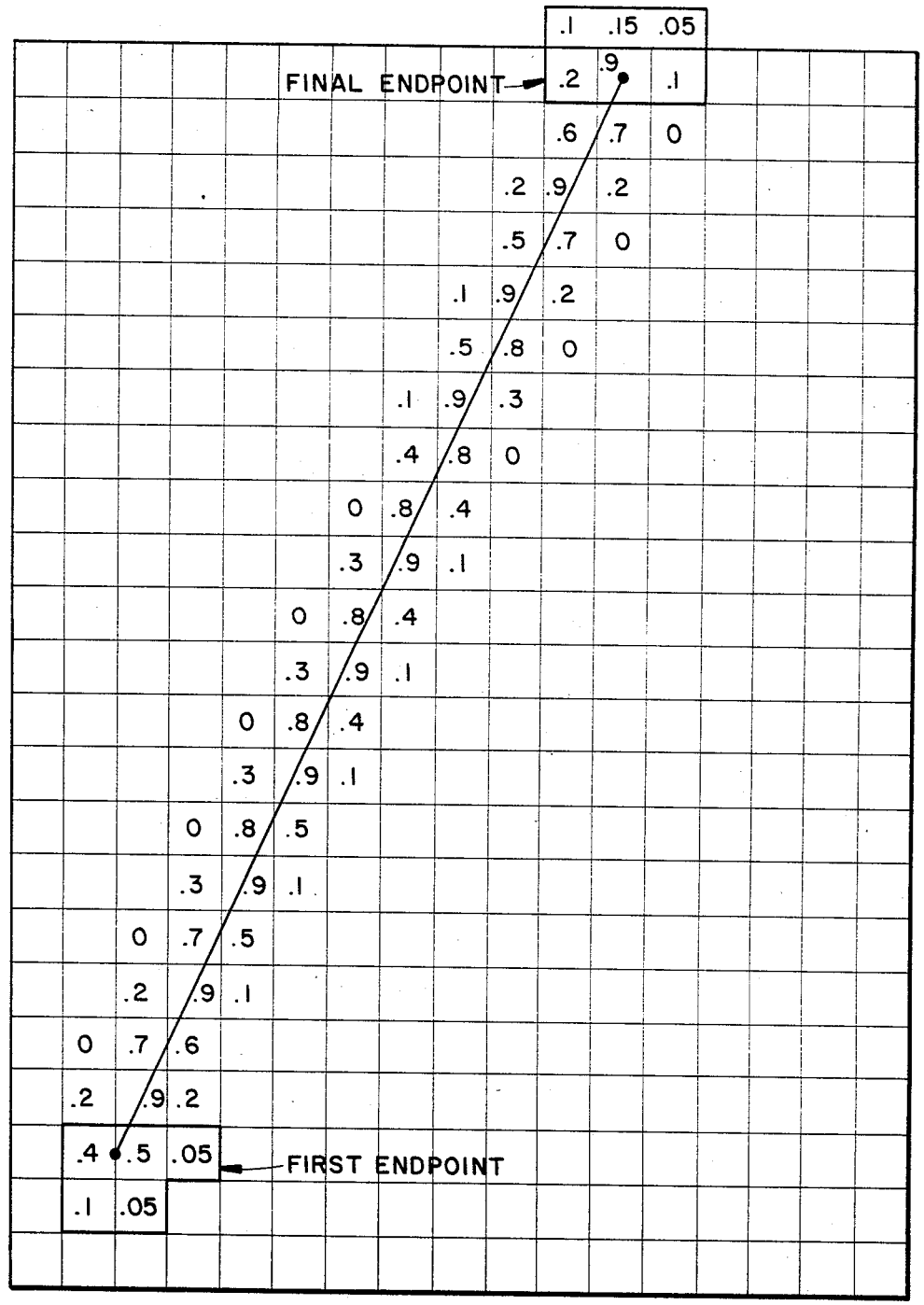

The arrangement of FIG. 4 is now clocked once, and the new X position written into Register 161 of FIG. 7. Simultaneously, counter 162 is loaded. (In this example, the new X position is binary 110011.011110, which has the same bottom integer bit as the previous X position.) The bottom two bits of the counter 162 are always loaded with zero. The third bit is loaded with a 0 if the bottom integer bit of the small axis position register 138 has changed since the last loading (implemented by gates 286 and 208), and 1 if it has not changed. The fourth counter bit is alternatively loaded with 0 and 1 directly by the microcode to indicate the current direction of the zigzag across the center piece of the line (FIG. 9B). It is loaded with 0 this initial time, giving a total counter 162 value of 4 (binary 0100).

At this point, the counter is incremented three times to write the first 3-pixel cross-section of the line. The first step will be up, and the other two to the right. The arrangement of FIG. 4 is clocked a second time, and another new X position written into the register 161 (binary 110011.111101, of which only 1.111101 is loaded into the register). Again, the bottom integer bit of the small axis position register 138 (X position) has not changed, so the third bit of the counter 162 is loaded with 1. The fourth bit is toggled to a 1, resulting in a value of 12 (hex C or binary 1100) being loaded into counter. The counter 162 is again incremented three times, stepping up once and then to the left twice, writing the second 3-pixel section of the vector.

On the third iteration of this, the X position becomes binary 110100.011011, which has incremented the integer portion since the previous step. Thus, the third bit of the counter 162 will be loaded with a 0, and the fourth bit toggled back to a 0, giving a final counter value of 0 (binary 0000). As the counter is clocked the three times, the first step will be diagonally up and right, followed by two steps to the right.

This process is continued through the nineteenth 3-pixel section. The microcoded engine 70 then directly (through the multiplexer 251 of FIG. 7) issues the required step (diagonally up and left in this case) to position the FB counters 205, 210 at the final endpoint position (rounded to the nearest pixel) ready for drawing this endpoint.

Final End Point of the Line

Because this endpoint faces in the opposite direction from the starting one, the microcoded engine loads the opposite octant value (6 in this case) into the octant register 164 of FIG. 7. It then proceeds exactly as for the first endpoint of a line in the sixth octant, incrementing the counter 162 six times to cover the pixels touched by this final endpoint.

To aid the implementor of a system such as is herein described, in generating the needed line smoothing table values for the ROM 163 of FIGS. 5 and 7, the following description of an example procedure is provided. It assumes the availability of any one of the known and available accurate (and presumably relatively slow) algorithms for generating smooth lines of arbitrary length and orientation. The algorithm should set intensities between 0 and 1 (represented to high accuracy) into pixel locations of a monochrome frame buffer. All lines drawn with this algorithm should be onto a blank frame buffer, so line crossing need not be handled by it.

Consider the example line used in the above operational description (as illustrated in FIGS. 9A–9E) drawn from 50.5,10 to 60,30. Generate this line using the accurate algorithm. Then proceed through the above operational description as if the line were to be drawn by the system, but interrupt the operation when the first step and alpha values are to be output from the ROM 163 (FIG. 7). The current position (the one addressed by the X and Y counters 205,210 in the frame buffer 200) is at 51,10.

Calculate the step values first. Remembering that steps happen before pixel writes, devise a path of adjacent pixels, starting at the current position and ending one to the left (below if in the first octant). The path must cover all pixels at this end of the line that were set to non-zero intensities by the accurate algorithm. Store the step values required to traverse this path into sequential locations in the ROM 163, starting at the address currently in the ROM input registers 161a & b and counter 162.

Now start through the same set of ROM locations again. Starting with the first, look at which pixel its step command will position the frame buffer. Read the intensity value from the accurate (heretofore "blank") frame buffer; scale it to be in the range of 0 to 29; and store it in the alpha portion of the ROM 163. Continue through the entire path generated above. After the last location used, store an alpha value of 31 to indicate the end of this section.

Tables for the center section of the line can be filled in a similar manner. The only change in procedure is that the three pixels in each section closest to the line are to be covered by the path, even if some of the intensities are zero. These pixels will simply generate zero values for alpha which, of course, would have no effect on the line drawn.

When enough lines have been generated with the accurate algorithm, and loaded into the ROM using the above procedure, the entire table will be filled. Of course, only lines in the one octant are required to fill the table, as hardware after the ROM 163 translates from the one octant to the others. Although a random selection of lines would certainly suffice to fill the table eventually, careful selection of the trial lines can avoid redundant calculations of table entries and speed the process.

We claim:

1. In a raster type image-generating system, a high speed arrangement for generating for display a smooth line of consistent thickness regardless of slope, in which said line is defined by a starting end point position and a concluding end point position specified to a fractional pixel precision comprising:
   (a) first means for deriving information representing the slope of said line to n bits of said fractional pixel precision;
   (b) means, responsive to said end point positions and to said first deriving means, for identifying a plurality of pixel positions relevantly proximate to said end point positions, and for identifying a plurality of one-dimensional arrays, each of said arrays being at least three contiguous pixel positions defining a cross-section point of the interior portion of said line between said end point positions;
   (c) second means, responsive to said end point positions and said deriving means, for deriving information representative of the distance of each of said pixel positions of said arrays from said line;
   (d) first means, responsive to said starting end point position, to said second deriving means and to said identifying means, for determining a value representative of a level of intensity between a selected minimum and maximum to be associated with each of said pixel positions relevant to said starting end point position, said value being a function of the location of said pixel position relative to said starting end point position;
   (e) second means, responsive to said first and second deriving means and said identifying means, for determining a value representative of a level of intensity between said selected minimum and maximum to be associated with each of said pixel positions of each of said arrays, said value being a function of the slope of said line and the distance between said pixel position and said line; and
   (f) third means, responsive to said concluding end point position, to said second deriving means and to said identifying means, for determining a value representative of a level of intensity between said selected minimum and maximum to be associated with each of said pixel positions relevant to said concluding end point position, said value being a function of the location of said pixel position relative to said concluding end point position.

2. A system as recited in claim 1 further comprising means for enabling said first, second and third determining means to effectively operate in a selected one of a plurality of coordinate system octants regardless of the octant orientation of said line.

3. A system as recited in claim 1 further comprising means for sequentially effecting operation of said first, second and third determining means.

4. A system as recited in claim 1 wherein said arrays are parallel to each other, and said second determining means effects a zig-zag sequential pattern of coverage of said arrays.

5. In a raster type image-generating system, a high speed arrangement for generating for display a smooth line of consistent thickness regardless of slope, comprising:
   (a) means for resolving in a single operative cycle first axis positional information to a selected number of bits of fractional pixel precision for each integral step in position along a portion of a second axis associated with said line; and (b) first means operatively connected to said resolving means and responsive to a combined input signal comprising the slope of said line, rendered to $n_1$ bits of fractional pixel precision, and the separation of said line, to $n_2$ bits of fractional pixel precision, from a relevant pixel position for providing a value which is representative of an intensity to which said pixel position is to be set in displaying said line.

6. A system as recited in claim 5, wherein said first means comprises means for providing said value for each one of an array of at least three contiguous pixel positions for each integral second axis step.

7. A system as recited in claim 6 wherein said values are provided during a single operative clock cycle of said providing means.

8. A system as recited in claim 5 or 6 further comprising polychromatic proportional weighting means, responsive to an existing value representative of an intensity associated with said pixel position, to a desired color of said line, and to said value for said pixel position provided by said first means for said line, for generating a new value representative of intensity and color for said pixel position.

9. A system as recited in claim 5 or 6 further comprising proportional weighting means, responsive to an existing value representative of an intensity associated with said pixel position, to a value representative of an intended intensity of said line, and to said value for said pixel position provided by said first means, for generating a new value representative of intensity for said pixel position.

10. An improved digital differential analyzer for determining in a raster type line generating display system first axis (Y) positional information to a selected number (n) of bits of fractional pixel precision for each integral step in position along a predetermined portion of a second axis (X), wherein the improvement comprises:
(a) slope register means for receiving information representing the slope of a line segment to be displayed;
(b) first register means for receiving initially a resultant of the function $(Slope \cdot DX) - (2^n \cdot DY)$, where
Slope = the slope of said line segment,
N = said selected number of bits of fractional pixel precision, and
DX and DY = differences between an ending and a starting first and second axis position, respectively;
(c) second register means for receiving said resultant plus DX;
(d) multiplexer means connected to said first and second register means for selectively receiving the contents of said first and second register means;
(e) first adder means, a first input of which is coupled to said multiplexer means;
(f) second adder means, a first input of which is coupled to said slope register means;
(g) accumulator means connected to the output of said first adder means, said accumulator means having an output connected to said multiplexer means, to a second input of said first adder means and to a carry input of said second adder means;
(h) first axis position register means for receiving intially a starting-position first axis information, said first axis position register means being connected to the output of said second adder means and having its output connected to a third input of said second adder means, said second adder means output comprising an integer portion and fractional portion representative of said first axis positional information for a given second axis position; and
(i) means for simultaneously actuating said first and second adder means and for synchronously clocking said accumulator means and said first axis position register means once for said given second axis position associated with said line;
Whereby said first axis positional information for said given second axis position is calculated during a single clock cycle for any value of said selected number n.

11. An improved analyzer as recited in claim 10 wherein said first and second adder means constitute portions of a single adder means.

12. In a raster type line generating polychromic display system, an improved arrangement for the proportional weighting of pixel position values as a function of intensity, a desired color and a proportionality constant to provide new pixel position values, wherein the improvement comprises first, second and third ROM means, each respectively associated with one of a set of primary colors and containing a table of addressable predetermined values, for providing a digital output signal representative of said respective primary color's portion of said new pixel position value in response to a combined digital input signal comprised of parts which are respectively representative of an existing pixel value, said desired color and $\alpha$, where $\alpha$ is a value representative of a fractional coverage of a pixel by a line to be displayed and constitutes said proportionality constant.

13. In a high speed raster type system for accurately generating a smooth line for display, the improvement in combination comprising:
(a) first means for resolving end points defining said line to fractional pixel precision;
(b) second means, responsive to said first means, for identifying positionally relevant pixel positions related to each of said end points enabling a true representation of said end points; and
(c) third means, responsive to said second means, for deriving in a predetermined sequence values representative of a level of intensity between a selected minimum and maximum to be associated with each of said positionally relevant pixel positions for each of said end points.

* * * * *